March 17, 1970     E. R. MORLEY     3,501,658
BIDIRECTIONAL MOTOR WITH DIRECTIONAL CONTROL MEANS FOR
STARTING IN EITHER DIRECTION
Filed April 17, 1969

INVENTOR.
EDWIN R. MORLEY
BY Charles J. Worth

AGENT

United States Patent Office 3,501,658
Patented Mar. 17, 1970

3,501,658
BIDIRECTIONAL MOTOR WITH DIRECTIONAL CONTROL MEANS FOR STARTING IN EITHER DIRECTION
Edwin R. Morley, Two Rivers, Wis., assignor to American Machine & Foundry Company, a corporation of New Jersey
Filed Apr. 17, 1969, Ser. No. 817,031
Int. Cl. H02k 7/118, 21/00
U.S. Cl. 310—41                                   7 Claims

ABSTRACT OF THE DISCLOSURE

A bidirectional synchronous A.C. motor with directional control having a pair of synchronous motor or drive portions each with directional control means permitting rotation of the rotor assembly thereof in the same direction. The motor portions are enclosed back to back in a housing on opposite sides of a common housing wall portion supporting a bearing means for a common shaft driven by each rotor assembly in a direction opposite to the direction when driven by the other.

This invention relates generally to bidirectional synchronous A.C. motors and more particularly to such motors having directional control devices.

In synchronous A.C. motors of the types embodied in clocks, time switch controls and the like, when first energized normally the rotors thereof are capable of starting to rotate either clockwise or counterclockwise depending in each instance upon the polarity of the first half cycle of the energizing A.C. current and the position of the rotor. To prevent the rotors of such motors from rotating opposite to the direction desired, many arrangements have been proposed and used with limited success and acceptance. This situation becomes further complicated when such a motor is required to be bidirectional.

An object of the present invention is to provide a synchronous A.C. motor with improved means for preventing the rotor thereof from turning in a direction opposite to that which is desired.

Another object of the present invention is to provide the foregoing motor with such direction control means which is positively operated by the rotor in response to the initial driving force of the energizing current.

And another object of the present invention is to provide the foregoing motor and directional control which requires no spring or biasing means.

The present invention contemplates a bidirectional synchronous A.C. motor having a shaft member and a pair of back to back driving portions each for causing the shaft member to rotate in a different one predetermined direction, each driving portion having a combination comprising a stator coil including a spool having a tubular body portion and a tubular crown portion at one end of said body portion in axial alignment therewith; said crown portion having an inner surface formed to provide an annular series of spaced inwardly extending fixed abutments; at least one pole piece disposed at the end of said body portion opposite from said crown portion and providing an annular series of spaced axially disposed salient poles within said body portion; a rotor member mounted on said shaft member and rotatable relative thereto; said rotor member having a permanent magnet face at its periphery in spaced face to face relationship with said salient poles; and lost motion means coupling said shaft and rotor members for rotation in unison after limited relative rotation therebetween; said lost motion means including a stop member positively moved in a plane normal to the axis of rotation of said shaft member between a retracted and an extended position in response to relative rotation in different directions between said rotor and shaft members and retained in the position to which it is moved, and said stop member engaging one of said fixed abutments when in its extended position thereby limiting said shaft and rotor members to rotation in unison to one predetermined direction when said stop member is in its retracted position.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

Figure 1:
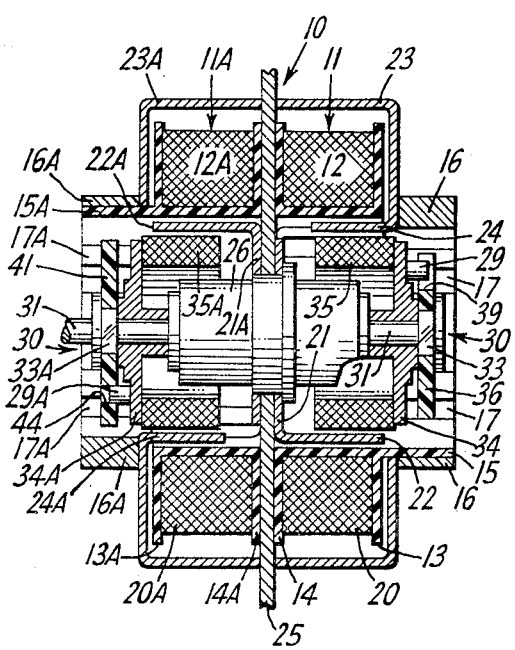
FIGURE 1 is a sectional view through a motor made in accordance with the present invention.
Figure 2:
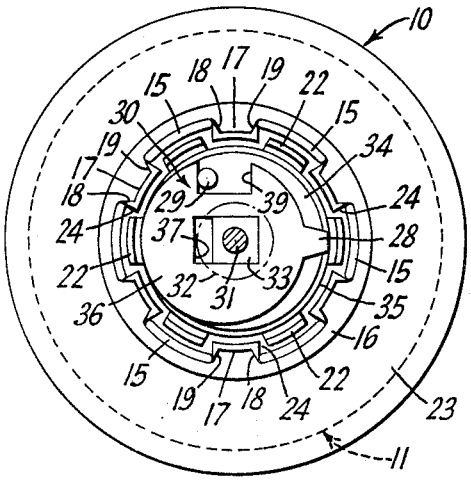
FIGURES 2 and 3 are elevational views illustrating opposite ends of the motor of FIGURE 1 with different forms of directional control means.
Figure 3:
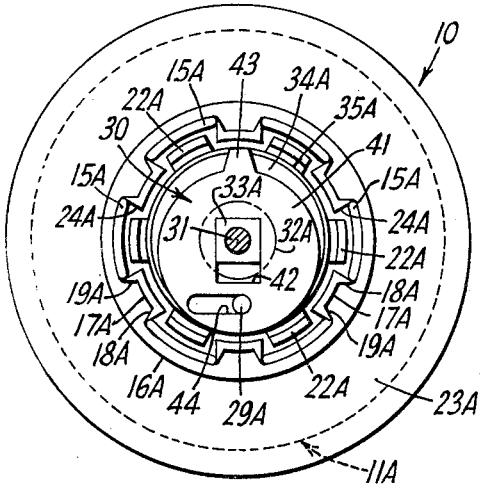

Referring now to the drawings and particularly to FIGURES 1 to 3, a motor in accordance with the present invention is provided with a stator assembly or means 10 and a rotor assembly or means 30 which includes a pair of rotor members each capable of causing the rotor assembly to be driven in only one direction opposite to the direction it is driven by the other rotor member. Therefore, the novel motor is bidirectional and is positively controlled to rotate in the direction desired. In essence, however, the novel motor is provided with back-to-back driving portions each having an A.C. excited stator portion encircling a permanent magnet rotor portion including a shaft member common to both rotor portions.

Referring now to the drawings and particularly to FIGURES 1 and 2 for one of the two driving portions, the stator means or assembly 10 includes a spool or spool assembly 11 of a suitable dielectric material having a tubular body portion 12, and annular flange 13 extending outwardly from one end of the body portion, and a second annular flange 14 extending outwardly from the body portion 12 and axially spaced from the flange 13. The flanges 13 and 14 with the body portion 12 therebetween define an annular recess for a coil winding 20. The spool or spool assembly 11 on the side of flange 14 opposite from the flange 13 is provided with a crown portion which forms a part of the directional control of the motor.

This crown portion may be formed by an annular series of spaced thin wall sections 15 extending axially from the body portion 12 which are encircled by a ring member 16 having an annular series of spaced lugs 17 which extend or protrude inwardly between the thin wall portions or sections 15 which form indent areas therebetween. Each of the lugs 17 provide two lateral stop faces or surfaces 18 and 19 adapted to be engaged to prevent the rotor member within the spool 11 from causing the rotor assembly 30 from turning each in one direction opposite from the other and depending upon the undesired direction of rotation. In this instance, the stop surfaces 18 of the lugs 17 are used to stop or prevent clockwise rotation of the rotor means or assembly 30. Although not shown, the thin wall portions 15, the ring member 16 and its lugs 17 may be of a unitary construction made as an integral part of the spool 11, or suitably fixed thereto by any means known in the art.

As in U.S. Patent 3,164,734 granted Jan. 5, 1965, to

R. A. Heinzen and assigned to the same assignee as is the present application, the spool 11 is fixedly mounted in a motor casing comprising, in part, a cover 23 connected to a wall portion 25 adjacent the flange 13. The wall portion 25 which normally separates the rotor and stator assemblies from the gear train of the motor. In the present motor the wall portion 25 separates the stator coil and the rotor member therein from a second stator coil and rotor member as will later be discussed.

The motor is provided with at least one pole piece 21 which is disposed adjacent the wall 25 and has an annular series of spaced salient poles or fingers 22 which extend from the outer periphery thereof along the inner surface of the tubular body portion 12 toward the flange 14. Although not shown, the salient poles 22 alternatively may be struck from the wall portion 25 or may extend from the inner periphery of a pole piece provided by a plate-like ring disposed between the annular flange 13 and the wall portion 25.

A second series of spaced salient poles 24 alternating between the salient poles 22 within the tubular body portion 12 may be struck from the motor cover 23, best shown in FIGURE 1, or may be provided by a pole piece (not shown) in the form of a plate-like ring disposed between the flange 14 and the motor cover. All of the first series of salient poles 22 are of the same instantaneous polarity, depending upon the half cycle of the A.C. current of the coil 20, which is reversed by the next subsequent A.C. current half cycle. When the motor is provided with two series or sets of salient poles, the instantaneous polarity of the second series of poles 24 is opposite to the polarity of the series of poles 22.

The rotor means or assembly 30 is provided with a shaft 31 which is supported by a bearing means 26 for rotation on *an* through the center of or the axis of the stator means or assembly 10. The shaft 31 extends from the side of the wall portion 25 opposite from the stator assembly 10, and terminates in a free end within the crown portion of the spool assembly 11. A disc or disc means 32, disposed in a plane normal to the axis of rotation of the rotor assembly 30, may be integral with or provided by a fitting member on the free end of the shaft 31, and has a central boss or boss portion 33 of rectangular shape which extends therefrom toward the bearing 26. As best shown in FIGURE 1, the disc means 32 and its boss portion 33 are disposed within the crown portion of the spool 11.

The rotor assembly 30 is provided with a permanent magnet rotor of any suitable construction which provides an annular face in spaced relationship within the salient stator poles 22 and 24. The annular rotor face generally is of a permanent magnet material with a series of polarized segments or areas each being of a polarity opposite to the polarity of the adjacent segments or areas as shown in the aforementioned U.S. Patent 3,164,734.

In this instance, as best shown in FIGURE 1, the rotor member is formed by a rotor disc or end wall portion 34 and an annulus portion 35 of magnetic material connected thereto for providing the permanent magnet face. The disc portion 35 is freely rotatable on the shaft 31 and is axially retained between the bearing 26 and the rectangular boss 33. A pin, cam or drive member 29, spaced radially outwardly from the shaft 31, is fixed at one end to the rotor member disc portion 34 and extends axially therefrom into the plane of the rectangular boss 33. The annulus 35 of permanent magnet material is fixed at one end to the side of the rotor member disc portion 34 opposite from the cam member 29 and extends axially therefrom toward the wall portion 25.

To complete this end of the rotor assembly 30, a cam follower or directional control member or disc 36 with an elongated rectangular slot 37 is provided. The directional control member 36 is disposed between the shaft end disc 32, and the rotor member disc portion 34 with the rectangular boss 33 disposed in the slot 37 which couples the directional control member for rotation with the shaft 31 and for sliding movement relative thereto along an axis which extends transversely through the axis of rotation of the rotor assembly 30. The directional control member or disc 36 has a protrusion or lug portion 38 which extends outwardly therefrom, and a peripheral slot or recess 39 which provides a pair of spaced substantially cam surfaces for the pin 29. The protrusion or lug portion 38 extends outwardly and the cam walls provided by the peripheral slot 39 are spaced along the axis of sliding movement of the directional control member or disc 36.

The directional control member or disc 36 is slidable on the boss portion 33 between a retracted position, where the lug portion or protrusion 38 does not extend beyond the circular face of the permanent magnet rotor member ring 35 as shown in FIGURE 2, and an extended position with the lug portion or protrusion forming a detent extending into an indent recess provided by a thin wall portion 15 between two spaced lug portions 17 of the spool crown. Thus, it should be seen that the novel directional control is, in effect, a lost motion device between the rotor member 34/35 and the shaft 31 of the rotor assembly 30.

When the protrusion or lug portion 38 engages the proper one of the faces of a spool assembly lugs 15 and prevents the rotor assembly 30 from turning in one direction, the polarized segments of the annular face provided by the permanent magnet portion 35 must be positioned or indexed relative to the salient stator poles 22 and 24 to cause the rotor assembly to start rotating in the opposite or desired direction when the magnetic field effect thereon reverses.

Inasmuch as the motor is viewed in opposite directions, counterclockwise rotation of the rotor assembly 30 in FIGURE 2 will appear a clockwise rotation in FIGURE 3. The motor construction or driving portion which has been described is disposed completely on one side of the wall portion 25, or to the right thereof when viewed in FIGURE 1 of the drawings.

Referring to FIGURE 3 for the other of the two driving portions, a duplicate or second rotor member is mounted on the shaft 31 within a duplicate or second stator structure disposed on the other side of the wall portion 25 or to the left thereof as viewed in FIGURE 1 of the drawings. Parts of the duplicate stator and rotor structures are identified by the same numbers having a suffix A added to the numbers identifying the corresponding parts heretofore described. The only differences in opposite ends of the motor are that the shaft 31 extends through the disc member 32A to its opposite end with the usual output gear (not shown) and another or modified form of directional control device 41 is provided to facilitate disclosure.

The directional control device 41 has an elongated rectangular slot 42 and a protrusion 43 which correspond to the slot 37 and protrusion 38, respectively, of the control device 36. In place of the peripheral slot or recess 39, the control device 41 is provided with an elongated slot 44 closed at its ends thereby forming a track for the pin 29A. The track 44 extends along an axis generally normal to the axis of movement of the control device 41 between its extended and retracted positions.

The control device 41 operates in the same manner as the control device 36 and, as viewed in FIGURE 3, permits the rotor member 34A/35A to rotate the shaft 31 only in the counterclockwise direction which actually is in the direction opposite to rotation of the shaft by the rotor member 34/35.

Figure 4:
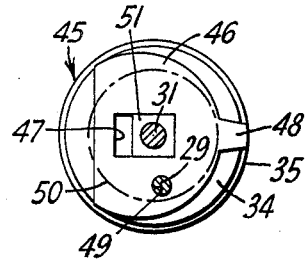
FIGURE 4 is an end view of a rotor assembly of the motor of FIGURE 1 with still another form of directional control means.

A modified rotor assembly portion 45 is shown in FIGURE 4 in which another form of directional control device 46 has an elongated rectangular slot 47 and a protrusion 48 corresponding to the slot 37 and protrusion 38, respectively, of the device 36. Instead of the slot 39 or 44, the control device 46 has an enlarged opening to receive the pin 29, and a modified disc member 50 is mounted on the shaft 31. In this arrangement, the pin 29 is now fixed in the disc member 50 and extends therefrom into the opening 49. Similarly, a rectangular boss 51 replaces the rectangular boss 33 of the disc member 32 and now is provided by the rotor disc 34 to be received in the elongated rectangular slot 47.

It should be understood that the directional control devices or cam follower means 36, 41 and 46 are interchangeable and are merely inverted as to position to reverse the desired direction of rotation permitted thereby. The specific construction of the rotor member 34/35 or 34A/35A forms no part of the present invention and may be modified accordingly. A different form of suitable permanent magnet rotor member from that shown in FIGURE 1 of drawings is disclosed in the aforementioned U.S. Patent 3,164,734.

In operation, with the motor in a quiescent state and initially positioned as shown in FIGURE 2, an A.C. current is provided to energize the coil 20 thus creating a magnetic field acting on the permanent magnet portion 35 to cause the rotor member disc portion 34 and cam or pin member 29 to rotate in a counterclockwise direction. The pin or cam member 29 is retained by this rotation in engagement with the rear cam surface of the peripheral slot 39 which is furthest away from the lug portion 38. This holds the directional control or cam follower member 36 in its retracted position and causes this retracted member and the shaft 31, coupled thereto by the rectangular boss 31 and slot 37, to rotate with the rotor member 34/35. This counterclockwise rotation of the shaft 31 will rotate the directional control or cam follower member 36A through the disc member 32A (in a clockwise direction as viewed in FIGURE 3) so the pin 29A is retained in the end of the slot 44 closest to the center of rotation of the rotor assembly 30, as shown in the drawings. Thus, the directional control or cam follower member 36A is also retained in its retracted position.

If, however, upon energization of the coil 20 the resulting field causes the permanent magnet portion 35 and the rotor member disc portion 34 to start rotating in a clockwise direction, the pin or cam member 29 is carried or moved by the rotating rotor member disc portion 34 away from the rear cam surface and into engagement with the other or front cam surface of the peripheral slot 39 thereby causing the directional control or cam follower member 36 to move to its extended position with lug portion or protrusion 38 extending outwardly past the periphery of the permanent magnet portion 35. As the extended directional control member 36 then starts to rotate in a clockwise direction, the protrusion or lug portion 38 moves into engagement with the face 18 of the adjacent spool assembly lug 17 to prevent clockwise rotation of the rotor assembly 30.

With the directional control means blocking rotation in this manner, simultaneous polarity reversal of each set of salient poles 22 and 24 in response to the A.C. energization of the coil 20 establishes a resulting field which causes the permanent magnet portion 35 and the rotor member disc portion 34 to rotate in a counterclockwise direction. The pin or cam member 29 moves back into engagement with the rear cam surface of the peripheral slot 39 causing the directional control member 36 to return to its retracted position and to rotate with the shaft 31 in the desired counterclockwise direction.

The peripheral slot 39 is angularly offset approximately 90 degrees in a counterclockwise direction 36 when in its extended position prevents the rotor assembly 30 from rotating in a clockwise direction.

To reverse the direction of the motor or cause the shaft 31 to rotate clockwise as viewed in FIGURE 2, the coil 20A is energized. The rotor member 34A/35A and the directional control or cam follower member 41 now cooperate, as heretofore described relative to members 34/35 and 36, to provide desired rotation and directional control. Similarly, the members 34/35 and 36 idle as heretofore described relative to members 34A/35A and 41.

In effect, the novel bidirectional motor with directional control as shown in the drawings and described herein is a pair of synchronous motors with directional control means permitting rotation in the same direction. The motors are enclosed back to back in a housing on opposite sides of a common housing wall portion supporting a bearing means for a common shaft for both rotor assemblies.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a bidirectional synchronous A.C. motor having a shaft member and a pair of back to back driving portions each for causing the shaft to rotate in a different one predetermined direction, each driving portion having a combination comprising:
    a stator coil including a spool having a tubular body portion and a tubular crown portion at one end of said body portion in axial alignment therewith,
    said crown portion having an inner surface formed to provide an annular series of spaced inwardly extending fixed abutments,
    at least one pole piece disposed at the end of said body portion opposite from said crown portion and providing an annular series of spaced axially disposed salient poles within said body portion,
    a rotor member mounted on said shaft member and rotatable relative thereto,
    said rotor member having a permanent magnet face at its periphery in spaced face to face relationship with said salient poles, and
    said lost motion means including a stop member positively moved in a plane normal to the axis of rotation of said shaft member between a retracted and an extended position in response to relative rotation in different directions between said rotor and shaft members and retained in the position to which it is moved, and
    said stop member engaging one of said fixed abutments when in its extended position thereby limiting said shaft and rotor members to rotation in unison to one predetermined direction when said stop member is in its retracted position.

2. The bidirectional synchronous A.C. motor in accordance with claim 1, and
    each of said spools having a pair of annular flange portions each extending outwardly from a different end of said body portion, and
    said spool body, crown and flange portions of each of said driving portions being integral.

3. The bidirectional synchronous A.C. motor in accordance with claim 1, and each of said driving portions further comprising
    another pole piece disposed at the end of said body portion adjacent said crown portion and providing another annular series of spaced axially disposed salient poles each positioned between a different two salient poles of said one pole piece.

4. The bidirectional synchronous A.C. motor in accordance with claim 3, and
    a motor cover enclosing each of said stator coils and providing said other pole piece for each of said driving portions.

5. The bidirectional synchronous A.C. motor in accordance with claim 3, and each of said crown portions comprising an annular series of equally spaced wall portions extending said one end of said body portion, and a cover member providing an annular wall portion encircling said annular series of spaced wall portions and having a plurality of spaced inwardly extending abutments each extending through a different space between two of said series of wall portions and terminating inwardly thereof, said cover member being open at one end adjacent the end of said body portion and having a wall at its other end closing the end of the space within the tubular body and crown portions.

6. The bidirectional synchronous A.C. motor in accordance with claim 1, and each of said stop members being a cam follower coupled to one of said shaft and rotor members for rotation therewith and for movement between its retracted and extended positions relative thereto, and the other of said shaft and rotor members having cam means engaging said cam follower thereby causing its movement to its extended and retracted positions and retaining it in the position to which it is moved.

7. The bidirectional synchronous A.C. motor in accordance with claim 6, and each of said cam followers being inverted relative to said rotor member adjacent thereto thereby reversing the one predetermined direction of rotation in unison of said shaft and rotor members.

References Cited

UNITED STATES PATENTS

| | | | |
|---|---|---|---|
| 2,796,571 | 6/1957 | Dunn | 310—112 X |
| 2,972,687 | 2/1961 | Kohler | 310—41 |
| 3,173,042 | 3/1965 | Fodor | 310—112 |
| 3,403,273 | 9/1968 | Higuchi | 310—41 |
| 3,448,308 | 6/1969 | Pervorse et al. | 310—41 |

WARREN E. RAY, Primary Examiner

U.S. Cl. X.R.

310—112